Aug. 20, 1968

C. E. PETERSON 3,397,485

PLANT STAKE

Filed Nov. 30, 1967

INVENTOR
C. E. PETERSON
BY
Sommers & Sommers
ATTORNEYS 3,397,485
PLANT STAKE
Carl E. Peterson, Upper Montclair, N.J., assignor to Eastern Tool & Mfg. Co., Belleville, N.J., a corporation of New Jersey
Filed Nov. 30, 1967, Ser. No. 687,035
1 Claim. (Cl. 47—47)

ABSTRACT OF THE DISCLOSURE

A stake, adapted to be driven into the ground without the use of tools, by the use simply of foot pressure, said stake being of such structural features as to facilitate the embedding thereof into the ground, to firmly anchor and interlock therewith, and for the rigid support thereby of a plant.

---

Figure 1:
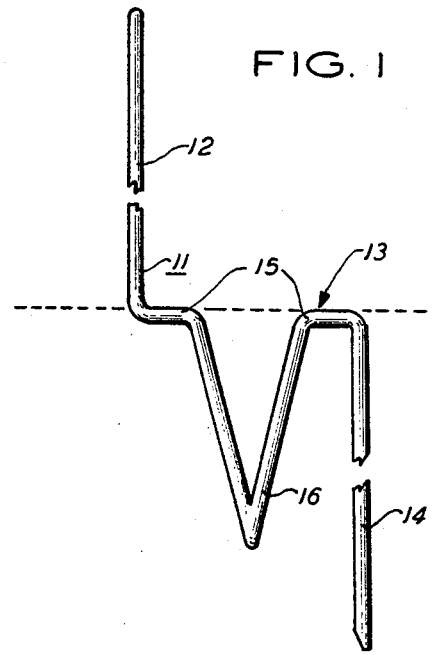

This invention relates to the support of plants on stakes, and more particularly to a stake adapted to be pressed into anchored relation with the ground simply by foot pressure.

Heretofore, plant stakes required hammers or rocks for driving them into the ground. Such procedures were time-consuming, awkward and inconvenient to use, and the danger of injury to the body of the user, particularly the hand, was very great if the object slipped even when used with the greatest of care. Furthermore, in the case of wooden stakes, the danger of splintering was very great.

The plant stake of the invention is provided with a formed section in the ground for convenient holding and easy foot pressure application, without danger of injury to the user. The device is safe and effective, and easy to handle, and to operate.

Figure 2:
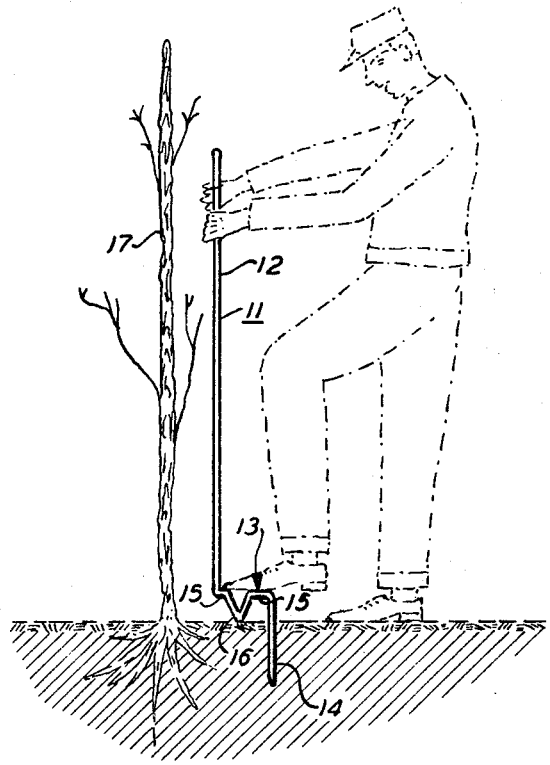
Figure 3:
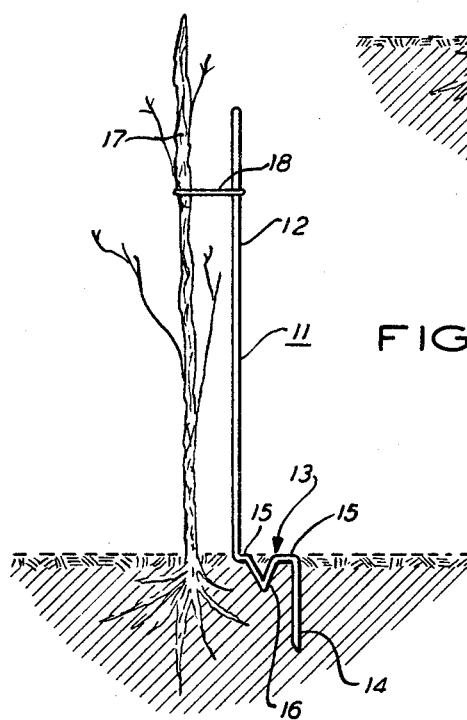

In the drawings, wherein similar reference characters indicate like parts:

FIG. 1 is a partly broken elevational view of a plant stake embodying the invention, FIG. 2 is a partly sectional elevational view of my plant stake shown being foot-pressed into the ground pursuant to the invention, and FIG. 3 is a partly sectional elevational view of the plant stake in place in the ground after being foot-pressed therein pursuant to the invention.

As will be seen from the drawings, forming part hereof, this invention relates to a plant stake, having features, as will be described below, such that simple foot pressure applied to a section of the stake will be sufficient to permit the stake to enter and become anchored in the ground, thereby providing a firm support for a plant. The formation of the part of the stake that goes into the ground will, for example, permit support of all plants of normal height that need staking, such as chrysanthemums, gladiolus, etc.

The plant stake 11 (FIG. 1) comprises an arm portion 12, a body portion 13, and an anchor or leg portion 14. The body portion 13, is comprised of flat portions 15 (FIG. 1) and a medial connecting portion 16. The medial connecting portion 16, in a shown embodiment of the invention, is V-shaped.

In operation (FIGS. 2 and 3) for example, the plant stake 11 is pressed into the ground by placing the tip of the leg portion 14 thereof on the ground, holding the arm portion 12 upright, and pressing the leg portion 14 and the body portion 13 into the ground by foot pressure, thereby easily and conveniently anchoring the plant stake in the ground, so that the plant 17 may be secured to the arm portion 12 of the device by a suitable band or fastener 18, or other means. The stake of the invention is thus simple to use and apply, without use of tools and in a safe fashion, but will maintain itself keyed in upright position in the ground and afford long, trouble free support for plants secured thereto.

The plant stake of my invention may be made of readily bent relatively inexpensive wire, and will be durable and long lasting in use.

The spaced apart flat foot pressure portions 15 of the plant stake of my invention provide effective bearing surfaces for application (FIG. 2) of foot pressure by the user, driving the intermediate, downwardly pointed V-shaped connecting portion 16 into the ground for interlocking relation therewith.

While the foregoing disclosure of exemplary embodiments is made in accordance with the patent statutes, it is to be understood that the invention is not to be limited thereto or thereby, the inventive scope being defined in the appended claim.

The invention claimed is:
1. A plant stake consisting of:
   (a) a V-shaped anchoring portion having spaced apart upper, flat alined portions substantially equal in length and adapted to receive a foot,
   (b) a ground penetrating leg portion continuous with and depending from the outer end of one of said flat portions, and longer than said V-shaped portion,
   (c) an arm portion continuous with and extending upwardly from the outer end of the other of said flat portions, said V-shaped, arm and leg portions being vertically coplanar.

References Cited
UNITED STATES PATENTS
1,073,114   9/1913   Gudgeon _____ 47—47
2,426,443   8/1947   Fetterman _____ 47—47

ROBERT E. BAGWILL, *Primary Examiner.*